US009093930B2

(12) United States Patent
Koch et al.

(10) Patent No.: US 9,093,930 B2
(45) Date of Patent: Jul. 28, 2015

(54) LINEAR ACTUATOR WITH A ROTATING BRUSHLESS DC MOTOR

(75) Inventors: Walter Koch, Schwanberg (AT); Siegfried Silber, Kirchschlag (AT); Herbert Grabner, Linz (AT); Peter Hutterer, Wilhering (AT)

(73) Assignee: LOGICDATA Electronic & Software Entwicklungs GMBH, Deutschlandsberg (AT)

( * ) Notice: Subject to any disclaimer, the term of this patent is extended or adjusted under 35 U.S.C. 154(b) by 156 days.

(21) Appl. No.: 13/248,415

(22) Filed: Sep. 29, 2011

(65) Prior Publication Data

US 2012/0068635 A1 Mar. 22, 2012

Related U.S. Application Data

(63) Continuation of application No. PCT/EP2010/054379, filed on Mar. 31, 2010.

(30) Foreign Application Priority Data

Mar. 31, 2009 (DE) .................... 10 2009 015 690

(51) Int. Cl.
  *H02P 6/00* (2006.01)
  *A47B 9/04* (2006.01)
(52) U.S. Cl.
  CPC .. *H02P 6/001* (2013.01); *A47B 9/04* (2013.01)
(58) Field of Classification Search
  USPC ......... 318/687, 135; 310/12.01, 12.14, 12.17, 310/13, 80, 98
  See application file for complete search history.

(56) References Cited

U.S. PATENT DOCUMENTS

| 4,318,038 | A * | 3/1982 | Munehiro ..................... 318/135 |
| 4,353,016 | A * | 10/1982 | Born ........................ 318/400.23 |
| 4,509,001 | A * | 4/1985 | Wakabayashi et al. ....... 318/687 |
| 4,847,712 | A | 7/1989 | Crapo |
| 4,918,346 | A * | 4/1990 | Tajima et al. ............ 310/156.43 |
| 5,789,835 | A * | 8/1998 | Obara ............................. 310/80 |
| 5,877,603 | A * | 3/1999 | Uchida et al. ................ 318/434 |
| 6,191,507 | B1 * | 2/2001 | Peltier et al. ............... 310/12.02 |
| 6,265,839 | B1 * | 7/2001 | Layton .......................... 318/115 |
| 6,330,837 | B1 * | 12/2001 | Charles et al. ............. 74/490.06 |
| 6,400,116 | B1 * | 6/2002 | Chen et al. .................... 318/599 |
| 6,841,953 | B2 * | 1/2005 | Bastholm .......................... 318/7 |

(Continued)

FOREIGN PATENT DOCUMENTS

| CA | 2 312 638 A1 | 12/2001 |
| DE | 31 44 630 A1 | 5/1983 |

(Continued)

OTHER PUBLICATIONS

Vas, P., "Vector Control of AC Machines (Monographs in Electrical and Electronic Engineering; 22)," Oxford Science Publications, ISBN 0-19-859370-8, 1990, 4 pages, Oxford University Press.

(Continued)

*Primary Examiner* — Rina Duda
*Assistant Examiner* — Bickey Dhakal
(74) *Attorney, Agent, or Firm* — Slater & Matsil, L.L.P.

(57) ABSTRACT

An embodiment linear actuator for an electrically adjustable piece of furniture includes a brushless DC motor arranged to effect a linear movement of the linear actuator, as well as a control device for controlling the motor.

30 Claims, 5 Drawing Sheets

(56) References Cited

U.S. PATENT DOCUMENTS

| | | | |
|---|---|---|---|
| 6,885,165 B2* | 4/2005 | Henley et al. | 318/687 |
| 6,917,126 B2* | 7/2005 | Tsuboi et al. | 310/12.04 |
| 7,053,583 B1* | 5/2006 | Hazelton | 318/400.03 |
| 7,262,575 B2* | 8/2007 | Kircanski et al. | 318/685 |
| 7,446,723 B2* | 11/2008 | Osaka et al. | 343/766 |
| 2001/0048249 A1* | 12/2001 | Tsuboi et al. | 310/12 |
| 2002/0066325 A1 | 6/2002 | Roither et al. | |
| 2002/0180397 A1* | 12/2002 | Henley et al. | 318/687 |
| 2004/0100169 A1* | 5/2004 | Huber et al. | 312/319.5 |
| 2004/0255774 A1* | 12/2004 | Hill | 92/25 |
| 2004/0263108 A1* | 12/2004 | Lim et al. | 318/640 |
| 2006/0021979 A1* | 2/2006 | Migliori | 219/158 |
| 2006/0208674 A1* | 9/2006 | Atmur | 318/254 |
| 2006/0279143 A1* | 12/2006 | Platz et al. | 310/51 |
| 2008/0045374 A1* | 2/2008 | Weinberg et al. | 475/342 |
| 2010/0005590 A1* | 1/2010 | Jensen | 5/611 |
| 2010/0126393 A1* | 5/2010 | Moller | 108/147 |

FOREIGN PATENT DOCUMENTS

| | | |
|---|---|---|
| DE | 199 59 512 A1 | 6/2001 |
| DE | 10 2007 030 473 A1 | 1/2009 |
| EP | 0 283 103 A1 | 9/1988 |
| EP | 1 273 247 A1 | 1/2003 |
| JP | 2005210813 A * | 8/2005 |
| WO | WO 01/71218 A1 | 9/2001 |

OTHER PUBLICATIONS

Kiel, J., "Control of permanent magnet synchronous machines without mechanical sensors for industrial use," Paderborn University, Dissertation, Cuvillier Verlag Göttingen, 2005, 13 pages.

"PANdrive PD-170-57 and TMCM-170-57," Trinamic Motion Control GmbH & Co., Hardware Manual, PD-170/TMCM-170 Manual (V1.08), XP-002602381, Nov. 21, 2007, 15 pages.

* cited by examiner

LINEAR ACTUATOR WITH A ROTATING BRUSHLESS DC MOTOR

This application is a continuation of co-pending International Application No. PCT/EP2010/054379, filed Mar. 31, 2010, which designated the United States and was not published in English, and which claims priority to German Application No. 10 2009 015 690.9, filed Mar. 31, 2009, both of which applications are incorporated herein by reference.

TECHNICAL FIELD

The invention relates generally to a linear actuator for an electrically adjustable piece of furniture and a table comprising such a linear actuator as well as a motor for the linear actuator.

BACKGROUND

There is an increasing desire for electrically adjustable pieces of furniture. With many tables, in particular desks, the level of the table plate can be electrically adjusted by means of a specific drive system. Beds, for example, comfort beds or hospital beds, may also be adjusted in their height or angle of inclination through electrical drive systems.

In the electrically adjustable pieces of furniture, linear actuators are used for required linear movements, which usually comprise an AC motor or a brushed DC motor whose rotational movement is converted into the linear movement with the aid of mechanical converting means.

Brushed DC motors of this type have a large constructional height in order to be able to provide a sufficient amount of mechanical energy for the linear movement. The large constructional height, however, impedes the construction of linear actuators in compact designs.

On the other hand, an exact driving scheme which is required for linear actuators in the furnishing sector can only be achieved with large effort in the case of an AC motor. Moreover, a required AC voltage is usually not available in the furnishing sector or can only be provided with increased effort in terms of safety aspects.

SUMMARY OF THE INVENTION

One embodiment of the invention is a linear actuator for an electrically adjustable piece of furniture which can be manufactured in a compact design and may be operated with DC current. Another embodiment of the invention is a table comprising a linear actuator of this type as well as a motor for the linear actuator.

Another embodiment of a linear actuator for an electrically adjustable piece of furniture comprises, e.g., a brushless DC motor (BLDC motor) arranged to effect a linear movement of the linear actuator, and a control device for controlling the motor.

Usually, the term "brushless DC motors" is used for permanently excited synchronous motors comprising commutation electronics; these BLDC motors have an energy density which is higher than that of brushed DC motors. This is why a brushless DC motor can be manufactured with a smaller constructional height than a brushed DC motor of comparable power. Thus, a linear actuator comprising the brushless DC motor may be realized so as to have a more compact design. Further, the brushless DC motor allows a direct drive system without any gear unit.

A brushless DC motor differs from the brushed DC motor in that an electrical commutation, for instance in the stator of the motor, is not effected mechanically by means of brushes, but electronically controlled. Here, a DC voltage applied to the input side of the control unit is fed to the corresponding stator windings by the control device in such a manner that the respectively generated magnetic field results in a rotation of the rotor or of the rotor of the motor. For this reason, brushless DC motors may also be referred to as electrically commutated motors. The control device typically comprises a regulated frequency converter.

It is preferred that the control device is integrated in the linear actuator, for instance in a housing of the linear actuator. In one embodiment, the control device forms an integrated unit with the brushless DC motor. In other words, the control device is directly arranged on the motor. This way connection lines between the control device and the motor become superfluous. This is an advantage, in particular, in the case where there are several distinct stator windings to be supplied with electrical current or electrical voltage. Furthermore, there are smaller losses such that the efficiency of the motor is increased.

In one example embodiment, the linear actuator further comprises means for determining an angular position of the brushless DC motor, which may be used by the control device for driving the motor. It will be assumed that the brushless DC motor is realized with three phases, whereas the control device comprises three controlled half-bridges serving to supply the brushless DC motor.

The means for determining the angular position may comprise two, three or more Hall sensors for instance, which are arranged on the motor, in particular on the rotor and detect a magnetic field pattern during rotation of the rotor. Three Hall sensors are provided, for instance, arranged in a circle with an angular distance of 120 degrees.

In another example embodiment, the means for determining the angular position are arranged for evaluating currents in the stator windings and determining an angular position therefrom. Here, these currents result from a counter voltage in the rotor, also termed as counter-electromotive force (counter EMF). In other words, the means for determining the angular position are arranged for determining it depending on the counter EMF.

As a further alternative, the means for determining the angular position are also capable of determining the angular position by center-tapping the neutral point with a star connection of the stator windings.

By means of the three controlled half-bridges, a respective DC voltage can be fed through to three excitation windings in the stator of the motor. The brushless DC motor may also have a larger number of excitation windings, however, and it may be sufficient in this case, too, that the three output voltages of the half-bridges, so-called phase voltages, are distributed to the distinct windings. To give an example, two independent windings are supplied by a common voltage or a common half-bridge.

In one example embodiment, the control device may adopt a first mode of operation in which the DC motor is accelerated from a rotational speed below a target rotational speed to the target rotational speed. Here, the control device is arranged to deliver a continuously alternating three-phased voltage with increasing frequency to the stator windings or excitation windings of the DC motor in the first mode of operation. In other words, the three-phased voltage exhibits a continuously increasing or decreasing effective voltage curve. Such a voltage curve differs, for example, from a square wave voltage with a periodic length resulting from the respective revolution period of the rotor.

The corresponding continuously alternating voltage curve in the three voltage phases is produced, for instance, via a pulse width modulation of an input DC voltage. Here, the phase voltages preferably feature a phase angle of 120 degrees relative to one another.

In this example embodiment, the frequency of the voltages is constantly increased starting from a low initial frequency to a setpoint frequency, without considering any retroactive effects from the excitation windings or the angular position. In other words, increasing the frequency is performed exclusively in a controlled manner and not in a regulated manner.

The slowly increasing frequency of the phase voltages results in the motor being accelerated only to a small extent at the beginning. This is why a jerky start-up of the motor can be prevented. This circumstance also results in an improved noise behavior of the drive system. In other words, using a motor which is controlled in such manner results in a noise optimization of the linear actuator.

In one embodiment, the control device is arranged for adjusting a respective amplitude of the three-phased voltage in the first mode of operation depending on a measured motor current. Usually, the motor current is proportional to the torque or force in the motor. With a corresponding evaluation of the motor current, adapting the voltage amplitude of the phase voltages may be carried out for setting a desired force or a desired torque. In other words, the amplitude value of the phase voltages is regulated by the control device depending on the motor current. The motor current may be determined separately for each phase by means of corresponding sensors.

Alternatively or in addition, the control device is arranged to adjust a respective amplitude of the three-phased voltage depending on the angular position of the DC motor in the first mode of operation. To give an example, the voltage amplitude of the phase voltage is adjusted corresponding to a previously known or calculated profile depending on the angular position. Such a calculation of the profile may also be performed in operation of the motor.

In a further embodiment, the control device may adopt a second mode of operation in which the DC motor is regulated to have an operating speed which is larger than or equal to the target rotational speed. Here, the control device is arranged for carrying out a regulation or closed-loop control of the three-phased voltage as a field-oriented regulation scheme in the second mode of operation, in particular as a field-oriented regulation of the rotational speed.

The regulation is carried out, for instance, such that the voltages delivered to the respective excitation windings are adjusted such that a resulting active component in the motor current is kept at a maximum and a resulting reactive amount in the motor current is kept at a minimum. Such a regulation may be based, for instance, on a Clark or Park transformation allowing a conversion between a three-phased system into an equal equivalent two-branch system. It is preferred that the reactive amount of the resulting motor current is not regulated down to zero in order to allow an improved behavior of the regulation system in terms of disturbances. Nevertheless, the reactive power in the motor is kept at a low value in this example embodiment.

In the second mode of operation, a regulation of the three-phased voltage is carried out depending on the angular position of the DC motor, for example. In particular, the angular position may be evaluated in the transformations mentioned above. If three Hall sensors are used for the angle determination, as is described above, a continuous angle pattern may be interpolated from respective zero-crossings in the measured magnetic field intensity and the rotational speed, for example.

In a further embodiment, the control device may adopt a third mode of operation in which the DC motor is controlled so as to go to standstill. Here, the control device is arranged for delivering the continuously alternating three-phased voltage with decreasing frequency to the stator windings of the DC motor in the third mode of operation. In other words, the third mode of operation uses a control scheme which operates substantially inverse to the one in the first mode of operation. In particular, a frequency of the phase voltages is stepped down in a controlled manner, whereas an amplitude of the phase voltages is regulated depending on the motor current and/or the angular position.

In one embodiment, the brushless DC motor during stepping down to standstill is not supplied in sinusoidal form with current or voltage till zero speed. In this embodiment, the current is initially kept constant shortly before reaching standstill, resulting in a constant torque, and later on is regulated down to zero when a defined time period has lapsed.

The rotational movement of the motor can be converted to the linear movement in the linear actuator in various ways by means of mechanical conversion means. To this end, systems comprising toothed wheels, toothed racks, chains or cables may be used, for instance. Preferably, the DC motor is provided for actuating a spindle which is suitable for converting a rotation of the motor to the linear movement of the linear actuator.

In various embodiments, the DC motor is provided for actuating the spindle by means of a gear unit, in particular a planetary gear unit. Thus, a faster rotational motion of the motor can be converted to a slower rotational motion of the spindle which, has a higher torque due to the speed reduction. This allows the use of motors delivering a torque at the motor shaft which is lower than that required at the spindle.

Alternatively, a brushless DC motor having a higher torque may be used as well. In this case, the DC motor is provided for directly actuating the spindle, i.e., without any gear unit. This allows the linear actuator to have an even more compact design.

In one example embodiment, the linear actuator further comprises a retaining means suitable for preventing the linear movement of the linear actuator in a state of rest. Thus, it will be avoided, for instance, that the linear actuator during standstill of the motor is forcibly moved by the weight of a table plate to be lifted. The retaining means is realized, for instance, in that the brushless DC motor during standstill is supplied with a braking current preventing a rotational motion of the motor caused by external influences. Alternatively, mechanical or electromechanical retaining means such as a mechanical brake or an electronically operable locking concept may also be provided. In such an arrangement, for instance, an electro-magnetically movable pin will be locked in place in a toothed wheel, a toothed rack or similar locking device or retracted therefrom.

The brushless DC motor of the linear actuator may comprise an internal rotor in which the electrical commutated excitation windings are inserted in an external stator. Preferably, however, the motor comprises an external rotor with which a motor can be realized which has a higher torque compared to an internal rotor.

Arrangements with any pole pair numbers may be used for the motor. It is preferred, however, that the brushless DC motor has an odd pole pair number, as it turned out that brushless DC motors with an odd pole pair number produce less running noises, thus being more inconspicuous in operation in a linear actuator for adjustable pieces of furniture.

Incidentally, it is of advantage to use pole pair numbers equal to or larger than three, as experience shows that higher pole pair numbers are able to produce higher torques, even in the case where the motor is operated with a lower rotational speed. This may be desirable in particular for a gearless drive system.

A brushless DC motor with a pole pair number of at least five is particularly advantageous. This reduces the rotational speed for a 50 Hz mains frequency to not more than 600 revolutions per minute, corresponding to the insertion of a speed transformation in a gear unit. At the same time, this measure will increase the torque delivered by the brushless DC motor. A further advantage of at least five pole pairs is the low noise emission resulting in lower running noises in connection with a linear actuator.

In one embodiment, a brushless DC motor comprising at least five pole pairs has a larger diameter than would actually be required for a given power. This results in the advantage that a low rotational speed is achieved, simultaneously with high torque. This allows to provide a direct drive system without a gear unit having at least a single stage. This drive system has a higher efficiency compared to a brushless DC motor required for the given power which comprises a single-stage gear unit necessary because of the required torque.

An example embodiment of a height-adjustable table comprises at least one linear actuator according to one of the example embodiments described above. Preferably, a height-adjustable table of this type comprises at least two linear actuators of the type described, with the control devices of the at least two linear actuators being connected to a bus system capable of transmitting control signals for the linear actuators. An operating device, for instance, may also be connected to the bus system, the operating device producing the required control signals for upward and downward movements of the table and transmitting these signals via the bus system to the control devices.

In one embodiment, a power supply for the at least two linear actuators may also be connected to the bus system. In doing so, the DC voltage used for generating the respective phase voltages may be directly obtained from the bus system. Correspondingly, there is no need to provide a separate current or voltage supply for the linear actuators.

BRIEF DESCRIPTION OF THE DRAWINGS

Embodiments of the invention will now be explained in more detail by means of example embodiments on the basis of the figures. Elements with identical function or effect carry the same reference numerals.

DETAILED DESCRIPTION OF ILLUSTRATIVE EMBODIMENTS

Figure 1:
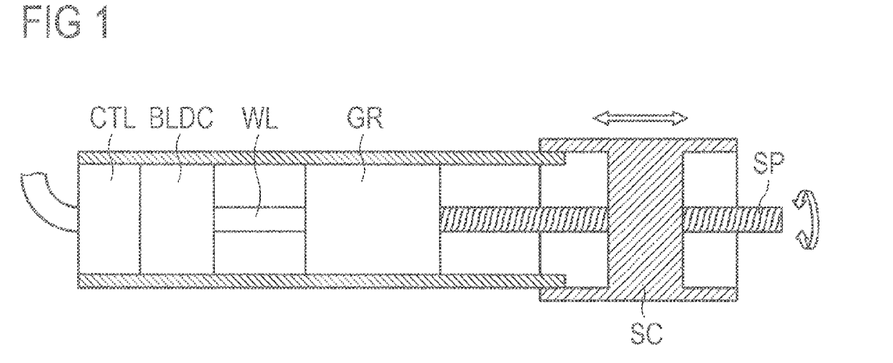
FIG. 1 shows a first example embodiment of a linear actuator.

FIG. 1 shows a schematic example embodiment of a linear actuator comprising a brushless DC motor BLDC. The linear actuator is illustrated in cross-section and comprises a control device CTL directly arranged on the motor BLDC and constituting an integrated unit together with it. Connecting lines for supplying the control device with voltage and/or control signals are arranged on the control device CTL. Via a shaft WL, the motor BLDC is mechanically connected to a gear unit GR driving a spindle SP. The gear unit GR is realized as a planetary gear unit, for example. A slide SC is placed on the spindle SP via a spindle nut (not illustrated here); with a corresponding rotation of the spindle SP, the slide can move to the right or left along the axis of rotation of the spindle SP.

Alternatively, the control device CTL may also be arranged separately from the motor BLDC within the linear actuator.

The brushless DC motor BLDC has a small constructional height. Nevertheless, large travel of the linear actuator can be achieved with the illustrated arrangement. Thus, the illustrated arrangement is able to achieve a good ratio between travel and constructional height of the drive system.

A brushless DC motor has a higher energy density compared to a conventional brushed DC motor which means that for equal performance its dimensions may be selected to be somewhat smaller. This is also supported in that brushless DC motors can achieve a higher efficiency than brushed DC motors.

Figure 2:
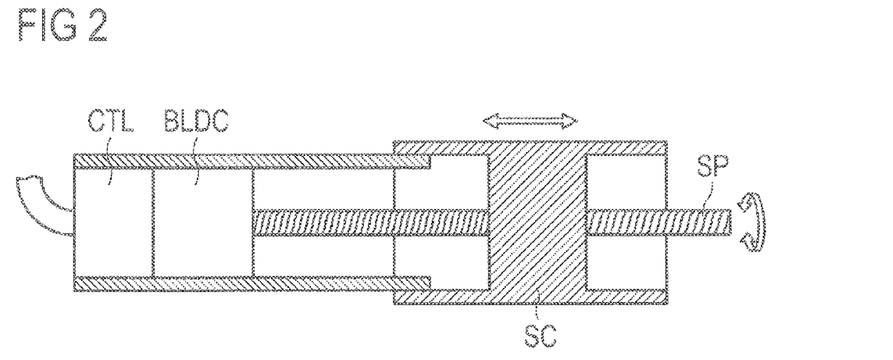
FIG. 2 shows a second example embodiment of a linear actuator.

FIG. 2 shows a further example embodiment of a linear actuator comprising a brushless DC motor BLDC. In contrast to the example embodiment of FIG. 1, the motor BLDC is provided here for directly actuating the spindle SP without the need for a gear unit. This allows the linear actuator to be even smaller or with a lower constructional height. The motor itself, however, should be selected such that it has a sufficient torque for driving the spindle SP even with low motor speeds.

Figure 3:
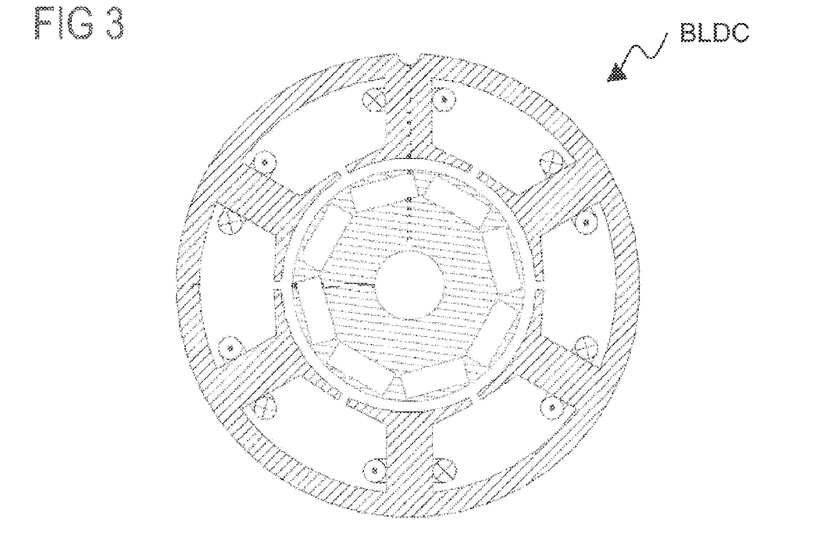
FIG. 3 shows an example embodiment of a brushless DC motor.

FIG. 3 shows an example embodiment of a brushless DC motor in schematic illustration. The motor has an external stator with six excitation windings which are marked with a cross or dot symbol corresponding to their winding sense. For reasons of clarity, a driving unit or wiring of the excitation windings is not illustrated here. The motor comprises an internal rotor with eight poles, i.e., four pole pairs. The internal rotor has a recess for receiving a shaft or spindle.

The motor may be driven, for example, by a three-phased voltage from the control device CTL. It is preferred that in the present example embodiment opposite excitation windings are connected in series or parallel to each other.

The number of the excitation windings and pole pairs in FIG. 3 is selected merely by way of example. Alternatively, the brushless DC motor may also be operated with a higher number of excitation windings which preferably is a multiple of three in order to carry out the driving process with three phase-shifted voltages. An odd number of the pole pairs should be selected so that a low-noise operation of the motor is made possible. Preferably, the motor has a pole pair number of five or seven. Brushless DC motors with pole pair numbers in this order have an enhanced torque even with low rotational speeds. Instead of the illustrated motor comprising an internal rotor, a brushless DC motor with an external rotor may also be used.

Figure 9:
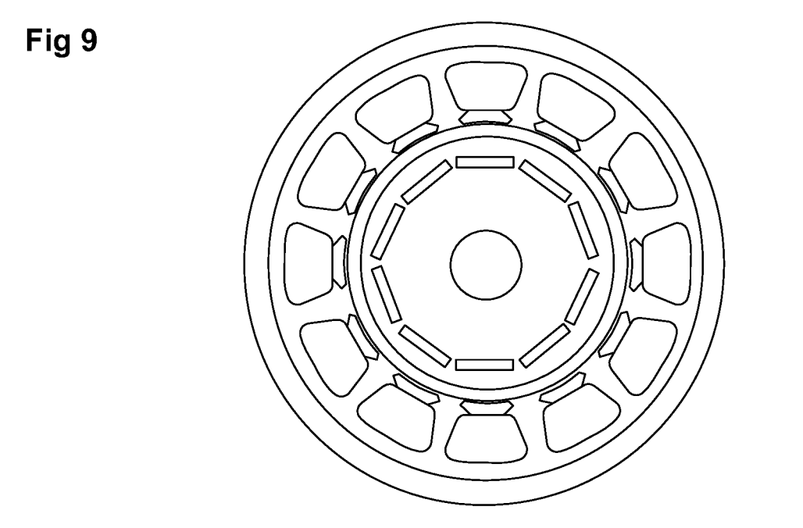
FIGS. 9 and 10 show further example embodiments of a brushless DC motor.

Similar to FIG. 3, FIG. 9 shows an example embodiment of a brushless DC motor in schematic illustration, however with ten poles, i.e., five pole pairs. The five pole pairs are part of an internal rotor of the motor. Furthermore, the motor has an external stator with twelve excitation winding.

Figure 10:
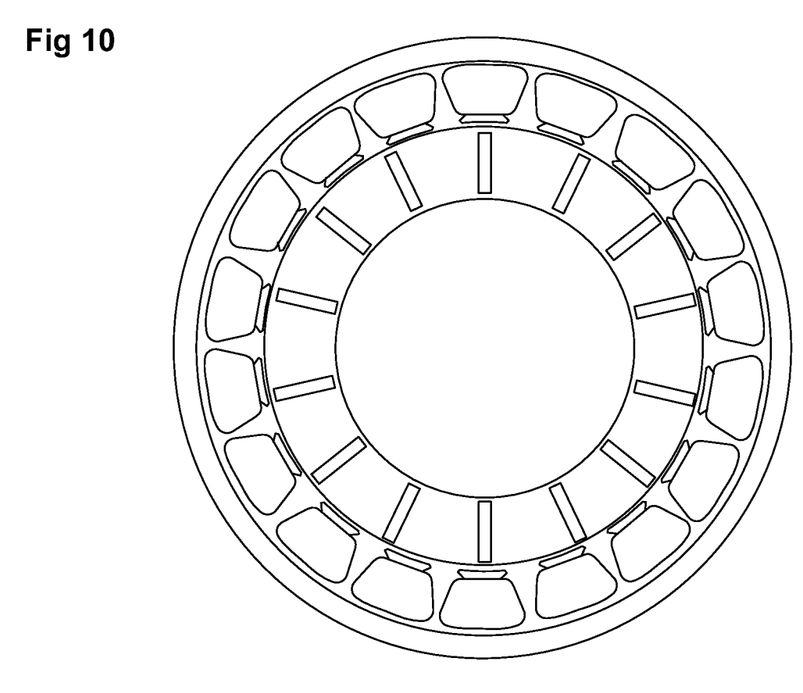

FIG. 10 shows a further example embodiment of a brushless DC motor in schematic illustration having an external stator with 18 excitation windings and an internal rotor with 14 poles, i.e., seven pole pairs. Both in FIG. 9 and FIG. 10 a driving unit and a wiring of the excitation windings are not illustrated for reasons of clarity.

Figure 4:
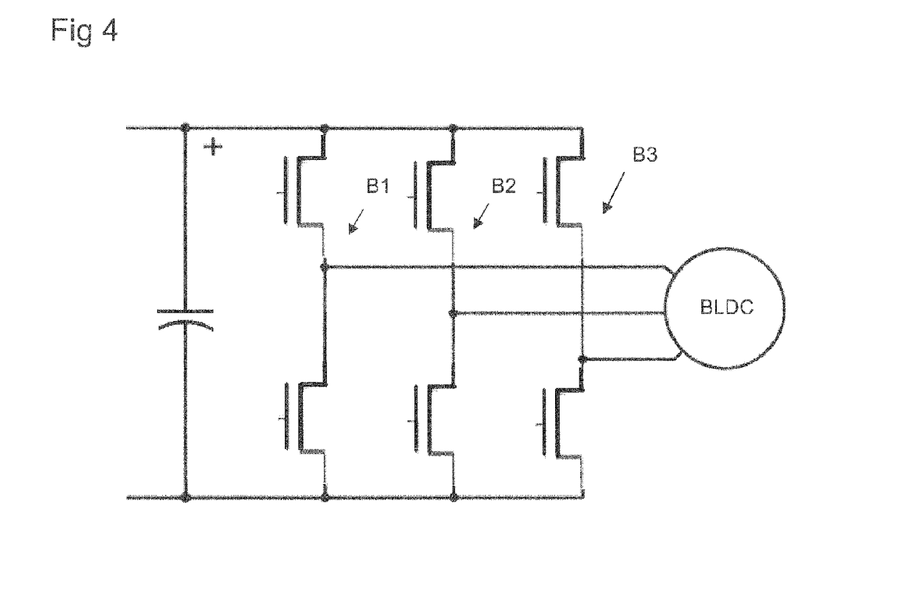
FIG. 4 shows a voltage generating means comprising three half-bridges.

FIG. 4 shows a block diagram of a voltage generating means as part of the control device CTL. The voltage generating means comprises three half-bridges B1, B2, B3 with two transistors each which in this example embodiment are illustrated as field effect transistors. A center tap of the respective half-bridges B1, B2, B3 is coupled to corresponding stator windings of the motor BLDC. Via the half-bridges B1, B2, B3, a voltage of the schematically illustrated voltage source may be fed to the corresponding terminals.

Desired output voltages of the half-bridges B1, B2, B3 may be generated by means of a corresponding driving scheme (not illustrated) of the transistor, for instance by pulse-width modulated control signals which are supplied to the control terminals of the transistors.

Figure 5:
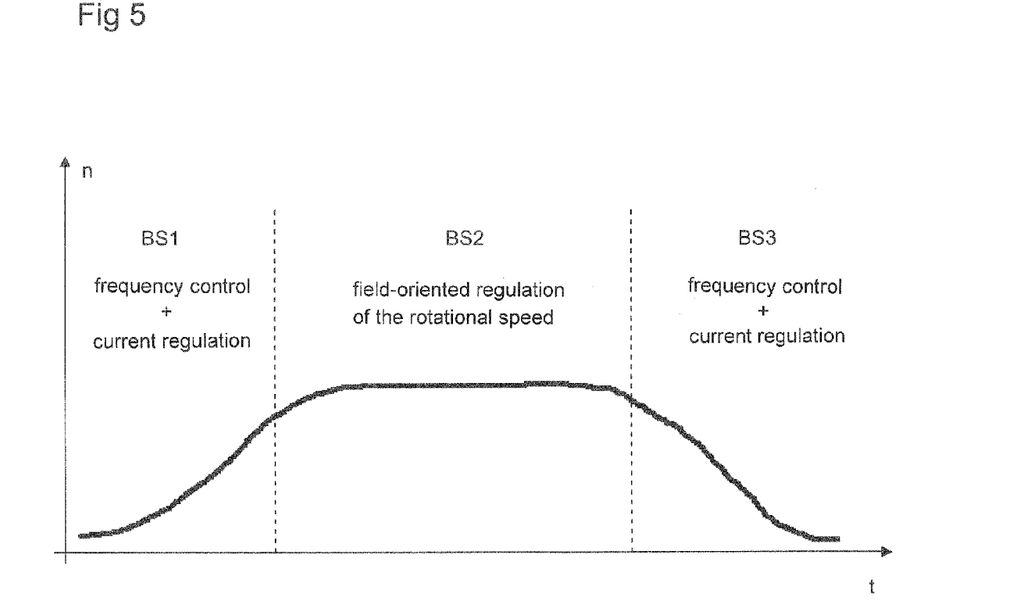
FIG. 5 shows a time diagram for a rotational speed control of a brushless DC motor.

FIG. 5 shows an example time diagram for the rotational speed regulation of the motor BLDC by the control device CTL. During operation of the linear actuator or the motor, a distinction can be made between at least three modes of operation BS1, BS2, BS3. In the first mode of operation BS1, the motor is accelerated from standstill or from a rotational speed below a target rotational speed to the target rotational speed. In the second mode of operation BS2, the DC motor is regulated so as to have an operating speed which is larger than or equal to the target rotational speed. In the third mode of operation BS3, the motor is controlled so as to go from movement, preferably from the operating speed, to a standstill.

As can be taken from FIG. 5, the rotational speed n of the motor in the first mode of operation BS1 continuously rises from a standstill to the target rotational speed, indicated by the point of intersection with the left-hand broken line. Here, the increase of the rotational speed is rather small at the beginning and rises over time. In other words, the first mode of operation BS1 operates with an initially low and slowly increasing acceleration. Thus, a smoother, less jerky operation during start-up of the motor is made possible. Moreover, this type of driving the motor results in a decreased noise emission compared to starting up with an initially higher acceleration.

Figure 6A:
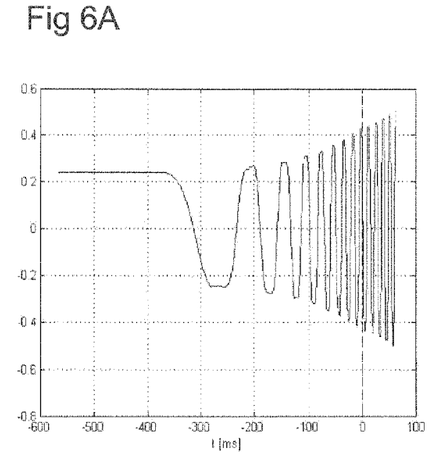
FIG. 6A shows an example voltage curve of a phase voltage.

Referring to FIG. 6A, these results will be achieved in that a phase voltage with a continuously alternating profile and increasing frequency is delivered to the stator windings of the motor BLDC. A corresponding temporal progression of the phase voltage is illustrated in FIG. 6A by way of example for one of the three phase voltages. The voltage curve illustrated in FIG. 6A begins with a constant voltage capable of providing a defined orientation of the motor. In the further progress, the frequency of the sinusoidally illustrated signal rises continuously, corresponding to the increasing rotational speed of the motor. For improving the signal behavior in the motor, the peaks of the sinusoidal oscillation are slightly flattened.

FIG. 6A illustrates only one of the phase voltages. The two other phase voltages have the same signal profile and are each shifted in phase by 120 degrees. For reasons of clarity, the other phase voltages are not illustrated in FIG. 6A.

Figure 6B:
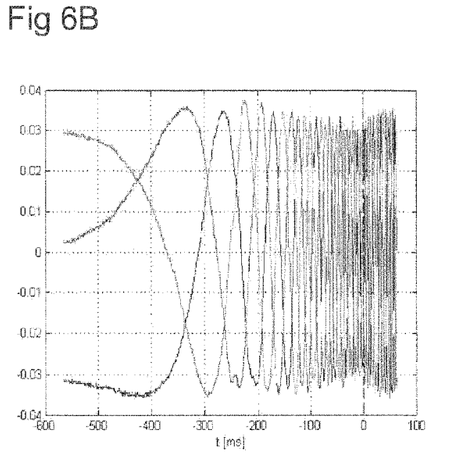
FIG. 6B shows an example profile of resulting phase currents.

FIG. 6B illustrates corresponding resulting currents in the three stator windings, resulting from the respective phase voltages corresponding to FIG. 6A. In particular, one of the three phase currents is based on the phase voltage corresponding to FIG. 6A. Again, the increasing frequency in the signals can be seen.

With reference to FIG. 5, in the first mode of operation BS1 the adaptation of the frequency of the phase voltages is carried out in a controlled manner, i.e., without any evaluation of possible measurands on the motor. The amplitude of the phase voltages is regulated, however. To give an example, the amplitude of the voltage is regulated such that a predefined length of a resulting current pointer appears. This can be done, for instance, with a regulation scheme on the basis of the motor current. It can be taken from FIG. 6B that the amplitude of the phase currents is essentially kept constant, whereas the phase voltage in FIG. 6A, corresponding to the regulation scheme, shows a slow increase in its amplitude. Alternatively or in addition, an angular position of the motor may also be included in the regulation scheme.

Determining the angular position of the motor may be effected, for example, by Hall sensors attached to the motor. As an alternative, it would also be possible to evaluate the effects of the counter-electromotive force in the motor on the motor current to determine the angular position. A further possibility to determine the angular position is to evaluate signals at the neutral point in case the stator windings are realized in a wye connection.

When the target rotational speed is reached, the system changes from the first to the second mode of operation BS2 in which a field-oriented rotational speed regulation is carried out. Here, the angular position of the motor is evaluated and the phase angle of the phase voltages to be output is regulated such that the motor is operated with virtually optimum efficiency by regulating the reactive power to a previously defined value which is selected so as to be comparably small.

If the motor is to be controlled back to standstill again, the control device is switched to the third mode of operation BS3. In doing so, a control of frequency takes place with simultaneous current regulation, like in the first mode of operation BS1. In other words, a frequency of the phase voltages to be output is controlled starting from the initial rotational speed, e.g., the operating speed, until standstill. In this mode of operation, too, it is advantageous to select the acceleration or negative acceleration so that the motor is decelerated in a substantially jolt-free manner. Due to the inevitable static friction and mechanical tolerances of the linear actuator resulting from the spindle and/or gear unit, it is advantageous if the motor BLDC during stopping until standstill is not continuously brought to zero speed. In doing so, a possible noise emission in the motor can be reduced. Prior to reaching standstill, the current in the stator windings is kept constant and is later brought to zero after a defined time period.

Advantageously, the driving functions in the first and third modes of operation BS1 and BS3, respectively, should be selected such that a mathematic differentiation can be carried out twice. In this case, a jerky operation of the motor can be prevented.

Figure 7:
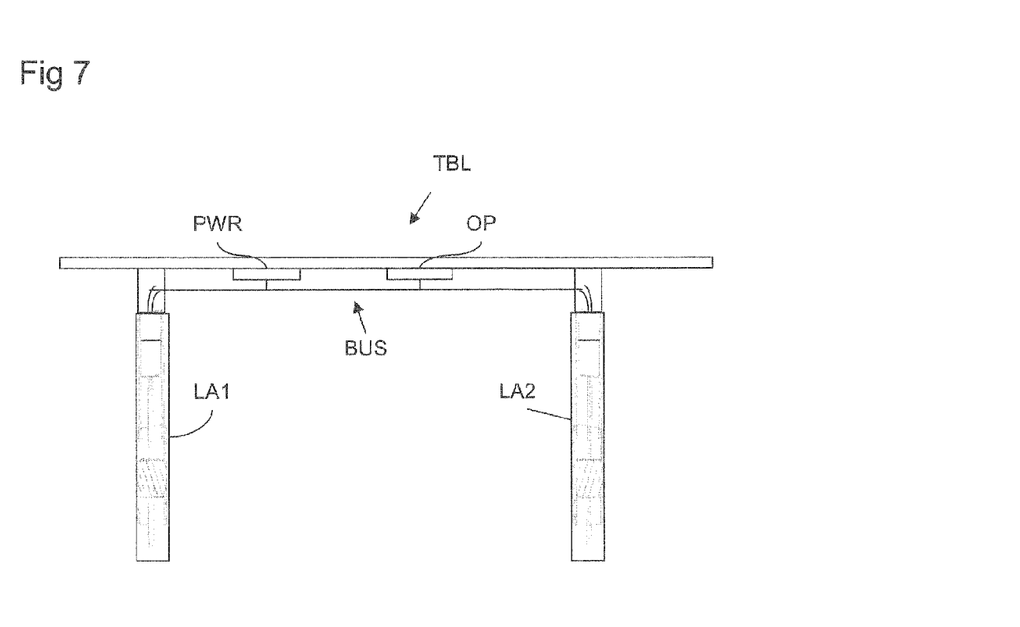
FIG. 7 shows an example embodiment of an electrically adjustable table.

FIG. 7 shows an example embodiment of a height-adjustable table TBL comprising first and second linear actuators LA1, LA2, which are arranged in corresponding table legs or in the table frame. FIG. 7 further shows an operating part OP and a power supply PWR which are connected to a bus system BUS. Further, the linear actuators LA1, LA2 are connected to the bus system.

By means of the operating device OP, an operator of the table can produce control signals which cause an upward or downward movement of the table. These signals are transmitted to the linear actuators LA1, LA2 via the bus system BUS. The power supply PWR serves for supplying the linear actuators LA1, LA2 with voltage so that separate power supply units for the drive systems are not required. Alternatively, embodiments comprising separate power supply units are also possible so that in this case the bus system BUS transmits the control signals only.

In case several drive systems are necessary for achieving a movement, like in the present example, the control devices of the linear actuators are driven in a coordinated manner such that the table will be raised or lowered in uniform fashion.

In one example embodiment, the operating part OP may also be integrated in one of the linear actuators or arranged on it so that no separate operating device is needed. In this case, the linear actuator together with operating device, for instance, performs a master function on the bus system BUS, while the other linear actuator(s) is/are driven by the master.

The previously described linear actuators may also be used in electrically adjustable beds. To give an example, there are comfort beds or hospital beds which may be adjusted via electrical drive systems in terms of height or inclination angle, for example.

Figure 8:
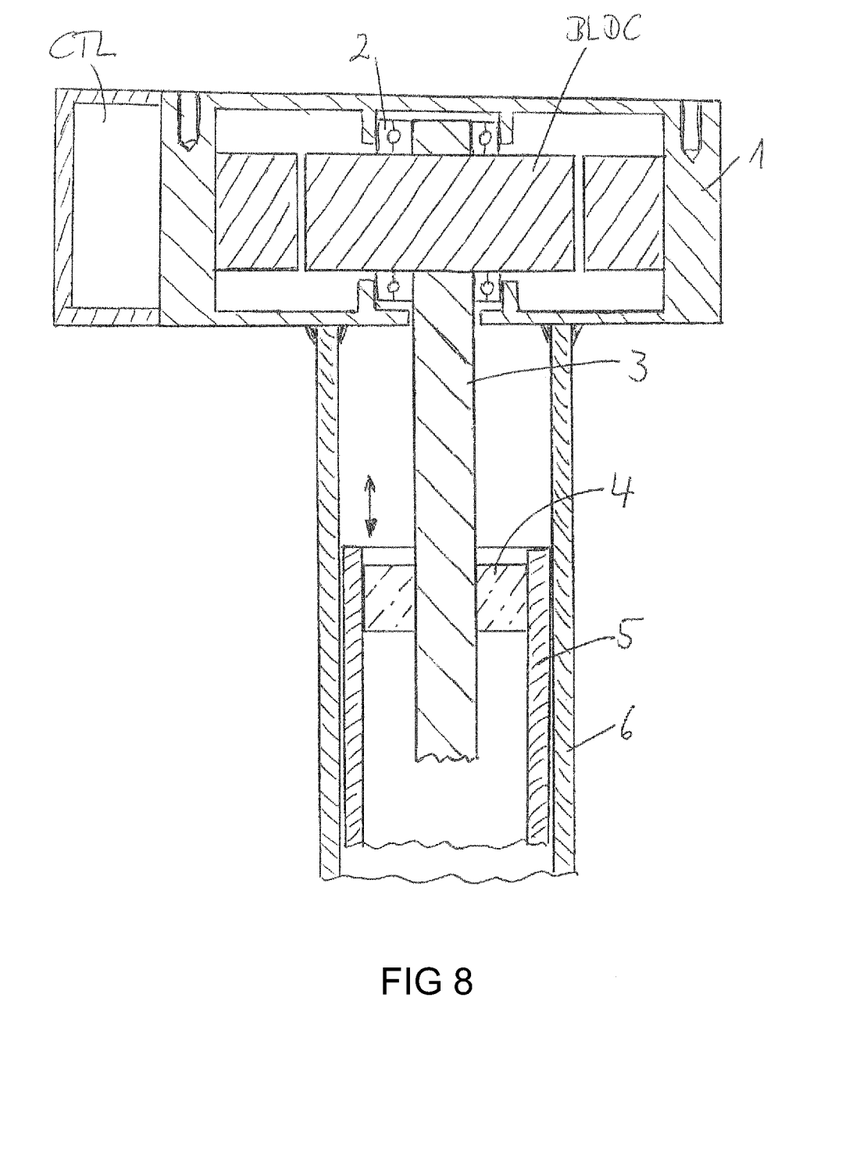
FIG. 8 shows a third example embodiment of a linear direct drive system comprising a brushless DC motor.

FIG. 8 shows a further example embodiment of a linear direct drive system comprising a brushless DC motor BLDC. The motor BLDC is provided for directly actuating the spindle 3 without a gear unit arranged therebetween. The BLDC is rotatably supported in a motor housing by means of a bearing 2. The spindle 3 acts on the spindle nut 4 and the inner guide tube 5 connected thereto and causes it to perform a linear movement in the direction of the arrow during rotation of the motor BLDC. Towards the outside, the drive system is guided and covered by the outer guide tube 6 which is firmly connected with the motor housing 1. The motor control unit CTL is arranged in a housing part which is flanged in the example embodiment, and is connected to the motor BLDC through connecting lines (not illustrated).

In order to be able to operate the motor BLDC in a rotational speed range of between 300 min$^{-1}$ to 600 min$^{-1}$, at least five pole pairs are provided, resulting in low noise emissions. With a desired linear travel speed of between 30 mm/s to 60 mm/s and a desired force of >600 N, a power of approximately 36 W is required. The motor BLDC may be realized with a small constructional height. The diameter of the BLDC is designed so as to develop a high torque at the intended low rotational speed.

When designed for an output power of 40 W, such a direct drive-type motor BLDC has a power requirement of 77 W. Compared to that, a brushless DC motor of smaller diameter, but requiring a gear unit for the demanded torque, has a power requirement of 95 W, whereas a standard DC motor comprising a two-stage gear unit needs 163 W. Thus, the proposed brushless DC motor BLDC for use in a direct drive system clearly has the highest efficiency and makes a gear unit obsolete.

The single-stage spindle according to FIG. 8 may also be realized as a two-stage spindle Likewise, instead of mounting the motor BLDC to the guide tube with the largest diameter, it may also be attached to the guide tube with the smallest diameter, merely requiring a somewhat modified constructional design.

What is claimed is:

1. A height-adjustable table comprising:
a linear actuator, wherein the linear actuator comprises
a rotating three-phased brushless DC motor arranged to effect a linear movement of the linear actuator, wherein the linear movement is along a vertical direction perpendicular to the surface of the height-adjustable table, wherein the linear actuator is configured to electrically adjust a height of the height-adjustable table along the vertical direction; and
a control device for controlling the brushless DC motor, the control device comprising three controlled half-bridges for delivering a continuously alternating three-phased voltage to stator windings of the brushless DC motor,
wherein the control device is configured to adopt a first mode of operation in which the brushless DC motor is accelerated from a rotational speed below a target rotational speed below a target rotational speed to the target rotational speed, the control device being arranged to deliver the three-phased voltage with increasing frequency in the first mode of operation such that a phase angle of the three-phased voltage is controlled without feedback from the brushless DC motor,
wherein the control device is configured to adopt a second mode of operation in which a regulation of the three-phased voltage is carried out as a field-oriented regulation, and
wherein the control device is configured to switch from the first mode of operation to the second mode of operation if the target rotational speed is reached.

2. The height-adjustable table according to claim 1, in which the control device forms an integrated unit with the brushless DC motor.

3. The height-adjustable table according to claim 1, further comprising means for determining an angular position of the brushless DC motor.

4. The height-adjustable table according to claim 1, wherein the control device is arranged to adjust a respective amplitude of the three-phased voltage depending on a measured motor current and/or depending on an angular position of the brushless DC motor in the first mode of operation.

5. The height-adjustable table according to claim 1, wherein the control device is configured in the second mode of operation to regulate the brushless DC motor to have an operating speed which is larger than or equal to the target rotational speed.

6. The height-adjustable table according to claim 1, wherein the control device is arranged to carry out the regulation of the three-phased voltage depending on the angular position of the brushless DC motor in the second mode of operation.

7. The height-adjustable table according to claim 1, wherein the control device is arranged to carry out, in the second mode of operation, a regulation of the three-phased voltage in such a manner that a respective reactive amount of a resulting current is minimized.

8. The height-adjustable table according to claim 1, wherein the control device is configured to adopt a third mode of operation in which the brushless DC motor is controlled so as to go to standstill, the control device being arranged to deliver the continuously alternating three-phased voltage with decreasing frequency to the stator windings of the brushless DC motor in the third mode of operation.

9. The height-adjustable table according to claim 1, wherein the brushless DC motor is provided for actuating a spindle which is suitable for converting rotation into the linear movement.

10. The height-adjustable table according to claim 9, wherein the DC motor is provided for actuating the spindle via a planetary gear unit, wherein a spindle nut is provided over the spindle for producing the linear movement.

11. The height-adjustable table according to claim 1, further comprising a retaining means suitable for preventing the linear movement of the linear actuator in a state of rest.

12. The height-adjustable table according to claim 1, wherein the brushless DC motor comprises an external rotor.

13. The height-adjustable table according to claim 1, wherein the brushless DC motor has an odd pole pair number.

14. The table according to claim 9, wherein the DC motor is provided for directly actuating the spindle without any gear unit.

15. A height-adjustable table comprising:
a bus system and at least two linear actuators,
wherein each linear actuator comprises a rotating brushless DC motor arranged to effect a linear movement of the linear actuator, and a control device for controlling the brushless DC motor,
wherein the at least two linear actuators is configured to adjust the height of the height-adjustable table, and
wherein each of the control device of the at least two linear actuators is connected to the bus system arranged to transmit control signals for the at least two linear actuators, and
wherein a power supply for the at least two linear actuators is connected to the bus system such that a DC voltage provided by the power supply can be directly obtained by the at least two linear actuators from the bus system, wherein each of the linear actuator comprises:
a housing, wherein the control device is disposed in the housing, and wherein the rotating brushless DC motor is rotatablv supported in the housing using a plurality of hearing;
a spindle coupled to the rotating brushless DC motor with or without a gear unit arranged therebetween;
a spindle nut configured to receive the spindle;
a first guide tube coupled to the spindle nut, wherein a rotating spindle is configured to produce a linear movement of the spindle nut and the first guide tube; and
a second guide tube disposed within or over the first guide tube, the second guide tube firmly coupled to the housing.

16. The table according to claim 15, wherein the brushless DC motor is provided for actuating the spindle configured to convert rotational movement into the linear movement.

17. The table according to claim 16, wherein the rotating brushless DC motor is provided for actuating the spindle via the gear unit.

18. The table according to claim 16, wherein the rotating brushless DC motor is provided for directly actuating the spindle without any gear unit.

19. The table according to claim 18, wherein the spindle nut is provided over the spindle for producing the linear movement.

20. The table according to claim 15, wherein the rotating brushless DC motor comprises at least five pole pairs.

21. The table according to claim 20, wherein the rotating brushless DC motor comprises an odd pole pair number.

22. The table according to claim 15, further comprising a retaining device configured to prevent the linear movement of the linear actuator in a state of rest.

23. The table according to claim 22, wherein the retaining device comprises electromagnetic locking device.

24. A height-adjustable table comprising:
a bus system and at least two linear actuators,
wherein each linear actuator comprises a rotating brushless DC motor arranged to effect a linear movement of the linear actuator, and a control device for controlling the brushless DC motor,
wherein the at least two linear actuators is configured to adjust the height of the height-adjustable table,
wherein each of the control device of the at least two linear actuators is connected to the bus system arranged to transmit control signals for the at least two linear actuators, and
wherein each of the linear actuator comprises:
a housing, wherein the control device is disposed in the housing, and wherein the rotating brushless DC motor is rotatably supported in the housing using a plurality of bearing;
a spindle coupled to the rotating brushless DC motor with or without a gear unit arranged therebetween;
a spindle nut configured to receive the spindle;
a first guide tube coupled to the spindle nut, wherein a rotating spindle is configured to produce a linear movement of the spindle nut and the first guide tube; and
a second guide tube disposed within or over the first guide tube, the second guide tube firmly coupled to the housing.

25. A height-adjustable tabe comprising:
a bus system and at least two linear actuators,
wherein each linear actuator comprises a rotating three-phased brushless DC motor arranged to effect a linear movement of the linear actuator, and a control device for controlling the brushless DC motor,
wherein each of the control device of the at least two linear actuators is connected to the bus system arranged to transmit control signals for the at least two linear actuators
wherein each of the control device of the at least two linear actuators comprises three controlled half-bridges for delivering a continuously alternating three-phased voltage to stator windings of the brushless DC motor,
wherein each of the control device of the at least two linear actuators is configured to adopt a first mode of operation in which the brushless DC motor is accelerated from a rotational speed below a target rotational speed to the target rotational speed, the control device being arranged to deliver the three-phased voltage with increasing frequency in the first mode of operation,
wherein each of the control device of the at least two linear actuators is configured to adopt a second mode of operation in which a regulation of the three-phased voltage is carried out as a field-oriented regulation, and
wherein each of the control device of the at least two linear actuators is configured to switch from the first mode of operation to the second mode of operation if the target rotational speed is reached.

26. The table according to claim 25, wherein the control device is arranged to adjust a respective amplitude of the three-phased voltage depending on a measured motor current and/or depending on an angular position of the brushless DC motor in the first mode of operation.

27. The table according to claim 25, wherein the control device is configured in the second mode of operation to regulate the brushless DC motor to have an operating speed which is larger than or equal to the target rotational.

28. The table according to claim 25, wherein the control device is arranged to carry out the regulation of the three-phased voltage depending on the angular position of the brushless DC motor in the second mode of operation.

29. The table according to claim 25, wherein the control device is arranged to carry out, in the second mode of operation, a regulation of the three-phased voltage in such a manner that a respective reactive amount of a resulting current is minimized.

30. The table according to claim 25, wherein the control device is configured to adopt a third mode of operation in which the brushless DC motor is controlled so as to go to standstill, the control device being arranged to deliver the continuously alternating three-phased voltage with decreasing frequency to the stator windings of the brushless DC motor in the third mode of operation.

\* \* \* \* \*